United States Patent [19]
Ito et al.

[11] Patent Number: 5,914,054
[45] Date of Patent: Jun. 22, 1999

[54] ELECTRICAL DISCHARGE MACHINE WITH A HANDLING ROBOT

[75] Inventors: Masaya Ito, Fussa; Meguru Yamaguchi; Susumu Ito, both of Oshino-mura, all of Japan

[73] Assignee: Fanuc Ltd., Yamanashi, Japan

[21] Appl. No.: 08/930,281

[22] PCT Filed: Feb. 6, 1997

[86] PCT No.: PCT/JP97/00294

§ 371 Date: Sep. 30, 1997

§ 102(e) Date: Sep. 30, 1997

[87] PCT Pub. No.: WO97/28921

PCT Pub. Date: Aug. 14, 1997

[30] Foreign Application Priority Data

Feb. 6, 1996 [JP] Japan .................................. 8-42220

[51] Int. Cl.⁶ .................................................. B23H 1/00
[52] U.S. Cl. ................................. 219/69.11; 219/69.14; 901/41
[58] Field of Search ............................. 219/69.11, 69.12, 219/69.17, 69.14; 901/41

[56] References Cited

U.S. PATENT DOCUMENTS

| 4,745,253 | 5/1988 | Girardin | 219/69.12 |
| 4,853,512 | 8/1989 | Scheider | 219/69.15 |
| 5,091,622 | 2/1992 | Ohba | 219/69.17 |
| 5,293,022 | 3/1994 | Onandia-Alberdi | 219/69.11 |
| 5,365,030 | 11/1994 | Hayakawa | 219/69.12 |
| 5,556,554 | 9/1996 | Morishita | 219/69.12 |

FOREIGN PATENT DOCUMENTS

| 61-8224 | 1/1986 | Japan . |
| 3-196920 | 8/1991 | Japan . |

*Primary Examiner*—Geoffrey S. Evans
*Attorney, Agent, or Firm*—Staas & Halsey

[57] ABSTRACT

A handling robot (13) for holding a part or a core by electrical discharge machining, and for taking a part or a core out of an electrical discharge machine is attached integrally to a front-side panel (11) of a submerged tank (9) of the machine. Thus, the handling robot (13) need not be controlled in concert with table feed for the electrical discharge machining. When the front-side panel (11) is swung open, the handling robot (13) swings to a retreating position.

6 Claims, 2 Drawing Sheets

ELECTRICAL DISCHARGE MACHINE WITH A HANDLING ROBOT

TECHNICAL FIELD

The present invention relates to an improvement of an electrical discharge machine with a handling robot for holding a part machined by electrical discharge machining or core removed, and for carrying a part or a core out of the machine.

BACKGROUND ART

Referring to FIG. 2, an outline of a submerged type of a wire electrical discharge machine, as an example of an electrical discharge machine, will be described.

In the wire electrical discharge machine 100, a column 30 is set up on a base 20, and its upper part projects horizontally to form a horizontal portion 40. An upper nozzle 25 is located under the distal end of the horizontal portion 40. A lower arm 60 is fixed horizontally to the lower part of the column 30, and a lower nozzle 70 is provided on its distal end, facing the upper nozzle 25. The base 20 is further provided with an XY-table 80, which carries a submerged tank 90 thereon. Thus, the submerged tank 90 is moved in the X- and Y-directions with respect to the base 20.

One side wall of the submerged tank 90 is formed with a window hole 120, which has a size large enough to allow the passage of the lower arm 60 and a Y-direction movement of the submerged tank 90 relative to the lower arm 60. A sealing plate 110, which is penetrated by the lower arm 60, can always close the window hole 120 while the submerged tank 90 moves in the Y-direction with respect to the lower arm 60. Also, the lower arm 60 can advance and retreat in its longitudinal direction with respect to the sealing plate 110. Therefore, even though the submerged tank 90 moves in the X- and Y-directions with respect to the lower arm 60, a sealed state between the submerged tank 90 and the lower arm 60 can be maintained at all times.

A supply reel 140, a braking roller 150, and a feed roller D are pivotally mounted on the front surface of the column 30. Further, guide rollers A, B and C are pivotally mounted on the distal end side of the lower arm 60, the inner surface of the sealing plate 110, and the upper end of a stay 130, that is fixed to the sealing plate 110, respectively. A wire electrode (hereinafter referred to simply as wire) 160 drawn out from the supply reel 140 reaches the lower arm 60 by way of the braking roller 150, upper nozzle 25, and lower nozzle 70, passes through the one side wall of the submerged tank 90, and reaches the feed roller D.

A workpiece (not shown) is placed between the upper nozzle 25 and the lower nozzle 70 in the submerged tank 90, and is moved integrally with the submerged tank 90. Thus, the workpiece moves in the X- and Y-directions with respect to the wire 160, and is cut out to a desired shape.

A handling robot is used to take out a cutout of the workpiece from the submerged tank after electrical discharge machining operation is finished. However, the handling robot must be given instructions for complex operation such as holding securely and taking out the workpiece machined to a unique shape, so that an operator is apt to be bound to carry out difficult operations.

As for the techniques for solving this problem and lightening the operator's burden, there are those disclosed in Japanese Patent Application KOKAI Nos. 60-201822 and 60-180726. According to these techniques, a workpiece handling robot equipped with an electromagnet, magnetic chuck, or suction cup is used to take out the workpiece or hold the cutout of the workpiece during the electrical discharge machining operation.

However, in the case of an electrical discharge machine disclosed in the above KOKAI No. 60-201822, a handling robot for removing a cutout of a workpiece is mounted on a workpiece carrying table. In such a case where a submerged tank is filled with water or oil for dipping, there is a problem such that the workpiece handling robot may be affected by moisture from the water, oil, etc.

On the other hand, in an electrical discharge machine disclosed in the above KOKAI No. 60-180726, a handling robot for removing a cutout of a workpiece is mounted integrally with a column of the electrical discharge machine. Thus, the position of the handling robot cannot be made to follow the movement of the workpiece carrying table that accompanies feed for machining. Therefore, during the electrical discharge machining operation, the handling robot cannot be made to perform the operation for holding the cutout of the workpiece and the like.

Moreover, in both of the electrical discharge machines disclosed in the aforesaid two publications, the handling robot for removing the cutout of the workpiece is mounted directly on or in close vicinity to the workpiece carrying table. In some cases, therefore, the existence of the handling robot become hindrance to operator's performance, especially when loading or unloading the workpiece or when preparing for machining operation.

Thus, it is conceivable to separate the handling robot from the body of the electrical discharge machine and place it on the floor on which the electrical discharge machine body is installed lest it should become a hindrance to the operation for attachment or detachment of workpiece. If this is done, however, the position of the handling robot cannot be made to follow the movement of the workpiece carrying table that accompanies the feed for machining. It is difficult, therefore, to enable the handling robot to hold the cutout of the workpiece during the electrical discharge machining operation.

DISCLOSURE OF THE INVENTION

The object of the present invention is to provide an electrical discharge machine equipped with a handling robot, the handling robot being designed so that it is capable of holding and taking out a product machined or cut out by electrical discharge machining during electrical discharge machining operation without being affected by water or oil and without hindering operator's performance.

In order to achieve the above object, in an electrical discharge machine with a handling robot according to the present invention, the electrical discharge machine has a table carrying a submerged tank thereon and used to move the submerged tank relatively to an electrode, and the handling robot is fixed to the outside of panels that constitute the submerged tank and is movable integrally with the submerged tank.

Preferably, one of the panels that constitute the submerged tank is swingably connected to another panel by means of hinges, and the handling robot is fixedly attached to the outer surface of the panel; thus, when the panel is swung open, the handling robot swings together with the panel to a retreated position.

Further preferably, one of the panels that constitute the submerged tank has a stay fixed on its outer surface by means of hinges so that the opening angle from the panel is variable, and the handling robot is fixed to the stay.

BEST MODE FOR CARRYING OUT THE INVENTION

Figure 1:
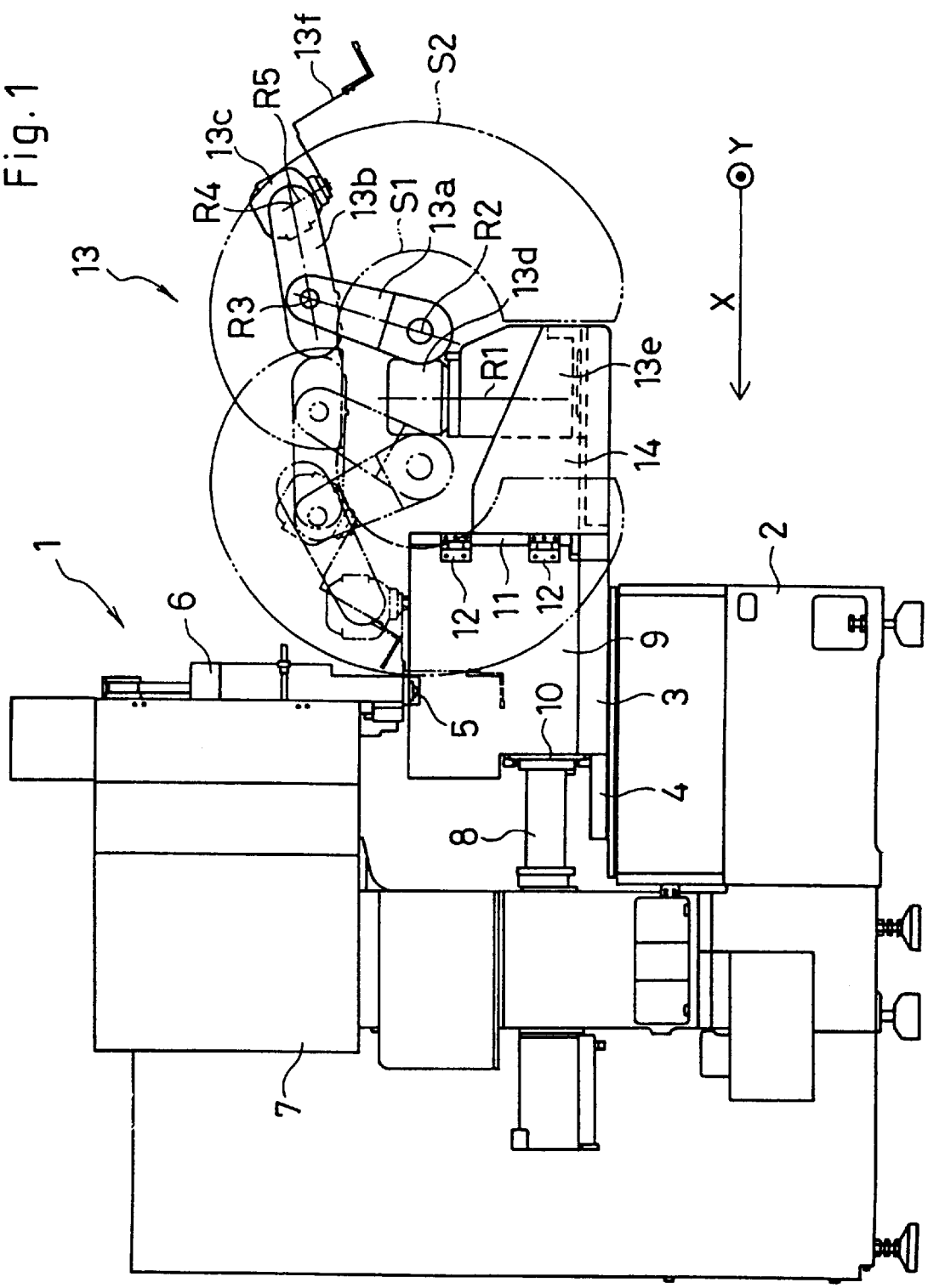
FIG. 1 is a side view of a wire electrical discharge machine with a handling robot according to one embodiment of the present invention.
Figure 2:
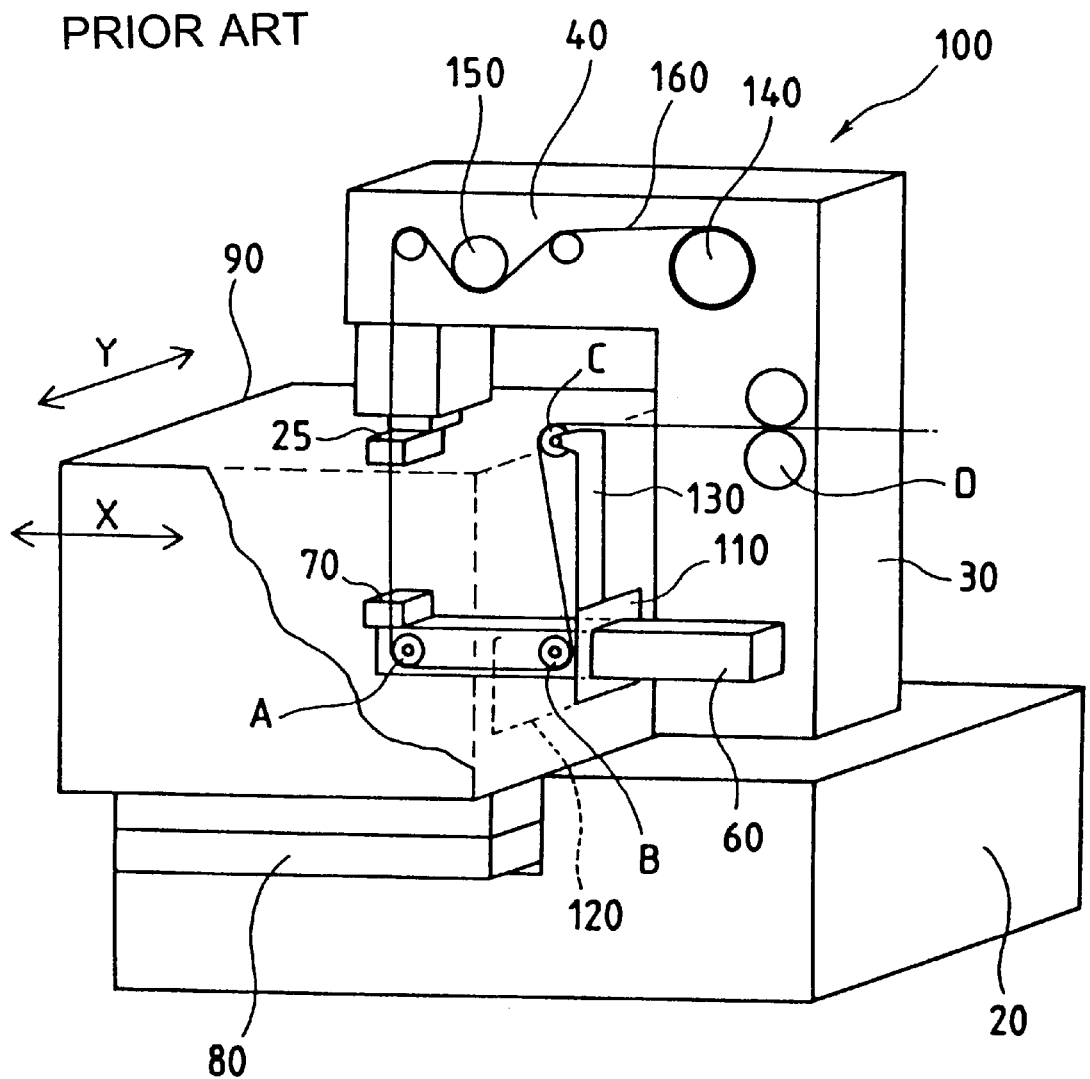
FIG. 2 shows a prior art example of a submerged type wire electrical discharge machine.

Referring to the side view of FIG. 1, an outline of a wire electrical discharge machine 1 according to one embodiment to which the present invention is applied will be described. This view is a left-hand side view of the wire electrical discharge machine 1 taken with respect to an operator's operating position.

The construction of the wire electrical discharge machine 1 will be described first.

The wire electrical discharge machine 1 comprises a bed 2 that serves as a foundation for supporting the apparatus, a table 3 for mounting a workpiece as an object of machining, a cross table (XY-table) 4 for holding the table 3 for movement in the X- and Y-directions (the X-direction is a direction indicated by the arrow in FIG. 1, and the Y-direction is a direction perpendicular to the X-direction and parallel to a floor on which the bed 2 is set, that is, the direction perpendicular to the drawing plane) with respect to the bed 2, a head 6 for vertically moving an upper wire guide 5, a column 7 holding the head 6 and fixed on the bed 3, a cover member 8 having therein an arm (not shown) with a lower wire guide (not shown) on its distal end and fixed on the side of the column 7, etc.

A submerged tank 9, which stores water or oil for dipping, is generally composed of four panels 4 that are arranged along the outer peripheral portion of the table 3. Thus, the bottom portion and the side plates of the submerged tank 9 are formed of the table 3 and the panels, respectively. Junctions among the panels are sealed hermetically, and the respective lower portions of the panels are also sealed hermetically as they are attached individually to the four corners of the table 3.

The cover member 8, which has therein the arm with the lower wire guide on its distal end, projects from the side of the column 7 into the submerged tank 9 through a rear-side panel of the submerged tank 9. The distal end portion of the arm is exposed from the distal end of the cover member in the submerged tank, and the lower wire guide, attached to the distal end of the arm, faces the upper wire guide 5 attached to the lower end of the head 6, that is held by the column 7.

The workpiece (not shown) as the object of machining is fixedly mounted on a workpiece stage (not shown), that is formed integrally with the table 3, and is situated between the lower wire guide and the upper wire guide 5. When the cross table 4 is moved in the X- and Y-directions that are perpendicular to each other, the table 3, workpiece stage and workpiece move integrally with the cross table 4 with respect to a wire (not shown), that is stretched between the lower wire guide and the upper wire guide 5, whereupon the workpiece is made to undergo desired machining.

Of the four panels constituting the submerged tank 9 the rear-side panel (panel on the side opposite the column 7) is formed with a slit-shaped aperture (not shown) that extends in the horizontal direction. Thus, even though this slit-shaped aperture is penetrated by the cover member 8, the submerged tank 9 can move relatively to the cover member 8 in the Y-direction. On the other hand, a sliding panel 10 has its center hole penetrated by the cover member 8 so as to allow the cover member 8 to move in its axial direction with respect to the sliding panel 10. As the submerged tank 9 moves with respect to the cover member 8, the sliding panel 10 relatively moves in a manner such that it always overlaps the rear-side panel of the submerged tank 9, thereby continually closing and sealing the slit-shaped aperture in the panel.

Among the panels that constitute the submerged tank 9, moreover, a front-side panel 11 that is situated opposite the rear-side panel is swingably attached to one of lateral panels (two panels except for the rear- and front-side panels) by means of hinges 12. A retainer (not shown) adapted to engage to the other lateral panel is mounted on the front-side panel 11 at the side opposite the side to which the hinges 12 are attached. With this arrangement, the front-side panel 11 can be swung open after the retainer is removed, so that operation for fixing a workpiece to or removing a workpiece from, the workpiece stage can be made possible.

The following is a description of the procedure for mounting a handling robot 13 for taking out a product and cutout machined by the wire electrical discharge machine 1 and from the submerged tank 9 and carrying them out.

A stay 14 is attached integrally to the outer surface of the front-side panel 11 of the submerged tank 9 at the position closer to side of the hinges 12. The handling robot 13 is fixed to this stay 14.

As shown in FIG. 1, the handling robot 13 is composed of a robot body 13e, a shoulder portion 13d mounted on the robot body 13e rockably around a vertical axis R1, an upper arm 13a having its proximal end mounted on the shoulder portion 13d by means of a horizontal axis R2, a forearm 13b having its proximal end mounted on the distal end of the upper arm 13a by means of a horizontal axis R3, a wrist portion 13c mounted on the distal end of the forearm 13b by means of a horizontal axis R4, and an end effector 13f mounted on the wrist portion 13c so as to be rockable around its central axis R5.

In this manner, the wrist portion 13c of the handling robot 13 is supported by the arms 13a and 13b that are rockable around the axes R1, R2 and R3, so that it is movable to any desired position within a space defined between a three-dimensional curved surface that is obtained by rotating a curve S1 represented by two-dot chain line in FIG. 1 around the vertical axis R1 and a three-dimensional curved surface that is obtained by rotating a curve S2 represented by two-dot chain line in FIG. 1 around the vertical axis R1.

The end effector 13f, which is mounted on the wrist portion 13c, is assured of a degree of freedom of posture for two axes by the horizontal axis R4 and the central axis R5. Thus, the workpiece in the submerged tank 9 can securely be held by means of a holding device that is attached to the end effector 13f. The holding device may be a conventional type with a magnetic-chuck or manipulator type or a suction-pad type.

As described above, in the wire electrical discharge machine 1 according to the present embodiment, the handling robot 13 is mounted integrally on the submerged tank 9. Therefore, even when the table 3 is fed in the X-axis direction and the Y-direction, the position of the handling robot 13 relative to the submerged tank 9 can be kept invariable.

Thus, it is not necessary at all to drive and control the handling robot 13 in concert with the table feed for electrical discharge machining. As a result, in carrying out final cutting operation in the wire electrical discharge machining process while supporting the workpiece by means of the holding device of the handling robot 13, machining can be effected easily without changing the relative positions of the end effector 13f and the workpiece, that is, without changing the positional relationship between the body and a cutout of the workpiece. Also, it is easy to hold the workpiece using the handling robot 13 at the start of the electrical discharge machining and to keep the workpiece held by the handling robot 13 until the workpiece and the cutout are separated completely from each other.

All the operation programs necessary for the handling robot 13 are an operation program for movement from a standby position to a workpiece holding position and an operation program for movement from the workpiece holding position to a workpiece delivery position, and any intricate operation program to cope with the table feed is not necessary. Thus, the position of the wrist portion 13c of the handling robot 13 need not be controlled in concert with any complicated table feed for the electrical discharge machining, so that, as long as a system for the delivery of the workpiece or conveyor system is available, a handling robot of simple structure such as one driven by means of an air cylinder or the like may be used as the handling robot 13.

Further, according to the present embodiment, the handling robot 13 is attached to the swingable front-side panel 11, which constitutes the submerged tank 9, through the stay 14, so that, by pulling the front-side panel 11 to swing it open after removing its retainer, the handling robot 13 can easily be evacuated beside the submerged tank 9. By doing so, the operator will become easily accessible to the workpiece in the submerged tank 9 for some manual operation (e.g., loading and unloading of the workpiece on the workpiece stage, preparation for a changeover to the next process) without being hindered by the handling robot 13. Furthermore, the handling robot 13 is not in contact with the table 3 when it is mounted, so that it can be free of the problem such as being wetted with water or oil.

Further, when it is necessary to enable the handling robot 13 to be evacuated aside with the front panel 11 kept closed (i.e., with the water or oil fluid in the submerged tank 9), this can be accomplished by swingably attaching the stay 14, for mounting the handling robot 13 thereon, to the front-side panel 11. More specifically, the stay 14 is attached to the front-side panel 11 by means of hinges so that the opening angle between the stay 14 and the front-side panel 11 can be changed freely. A retainer is needed to keep the stay 14 in a fixed posture with respect to the plane of the front-side panel 11.

The above description is related to the embodiment in which the handling robot is attached to the submerged tank of the submerged type wire electrical discharge machine; however, the present invention is also applicable to an electrical discharge machine designed for profiling of a workpiece submerged in a water filled in a submerged tank. The profiling electrical discharge machine of this type, like the case of the wire electrical discharge machine with the submerged tank shown in FIG. 1, is designed to obtain a desired shape by feeding a table, which carries the submerged tank thereon, in the X- and Y-axis directions, with the X and Y coordinate values of an electrode kept fixed (with the Z coordinate value being variable), that is, by moving the electrode relatively to the workpiece in the directions of X-, Y- and Z-axes.

As described above, according to the present invention, the positional relationship between the handling robot and the workpiece can be maintained constant, regardless of the feed of the table, without giving instructions for any intricate operation or inputting operation programs to the handling robot, and satisfactory machining accuracy can be achieved especially in cutting the workpiece during wire electrical discharge machining operation while holding it by means of the handling robot.

Furthermore, since the handling robot is mounted outside a swingable door of the submerged tank, problem such as having the handling robot wetted with water or oil in the submerged tank, which can cause mechanical or electrical troubles, can be prevented. Moreover, the operator is free to open the swingable door in order to carry out manual operation such as those for loading and unloading of the workpiece or the like, since the handling robot can automatically be evacuated from the operator's working area to secure the operator's working space.

We claim:

1. An electrical discharge machine with a handling robot, comprising:

an electrical discharge machine having a table carrying a submerged tank thereon and used to move the submerged tank relatively to an electrode; and a handling robot for holding and taking out a workpiece in the submerged tank and a cutout, the handling robot being fixed directly or indirectly to the outside of panels constituting the submerged tank of said electrical discharge machine and movable integrally with said submerged tank, wherein one of the panels constituting said submerged tank has a stay fixed on the outer surface thereof, and said handling robot is mounted on the stay.

2. An electrical discharge machine with a handling robot according to claim 1, wherein said submerged tank is formed from the panels, and one of the panels is swingably connected to another panel, and said handling robot is mounted on the stay on the outer surface of the swingable panel.

3. An electrical discharge machine with a handling robot according to claim 2, wherein said stay is fixed on the outer surface of the swingable panel.

4. An electrical discharge machine with a handling robot according to claim 1, wherein the stay is fitted to said submerged tank by hinges so that the opening angle of said panel is variable.

5. An electrical discharge machine with a handling robot according to claim 1, wherein said electrical discharge machine is a submerged type wire electrical discharge machine.

6. An electrical discharge machine with a handling robot according to claim 1, wherein said electrical discharge machine is a profiling electrical discharge machine for profiling the workpiece submerged in a water fluid in the submerged tank.

* * * * *